United States Patent [19]
Wolfe

[11] Patent Number: 4,796,220
[45] Date of Patent: Jan. 3, 1989

[54] METHOD OF CONTROLLING THE COPYING OF SOFTWARE

[75] Inventor: Everett W. Wolfe, Lauderdale Lakes, Fla.

[73] Assignee: Pride Software Development Corp., Boca Raton, Fla.

[21] Appl. No.: 941,411

[22] Filed: Dec. 15, 1986

[51] Int. Cl.[4] .............................................. G06F 12/14
[52] U.S. Cl. .................................................... 364/900
[58] Field of Search ... 364/200 MS File, 900 MS File, 364/300; 380/4; 340/825.31, 825.34

[56] References Cited

U.S. PATENT DOCUMENTS

| | | | |
|---|---|---|---|
| 4,562,306 | 12/1985 | Chou et al. | 364/200 |
| 4,593,353 | 6/1986 | Pickholtz | 364/200 |
| 4,644,493 | 2/1987 | Chandra et al. | 364/900 |
| 4,652,990 | 5/1987 | Pailen et al. | 364/200 |
| 4,685,055 | 8/1987 | Thomas | 364/200 |
| 4,688,169 | 8/1987 | Joshi | 364/200 |
| 4,740,890 | 4/1988 | William | 364/200 |
| 4,748,561 | 5/1988 | Brown | 364/300 |

Primary Examiner—Raulfe B. Zache
Assistant Examiner—Eric Coleman
Attorney, Agent, or Firm—Harry W. Barron

[57] ABSTRACT

An authorized user of the program is allowed to make any number of backup copies of a computer program and to execute each such backup copy on the same authorized machine, but is inhibited from executing either the original or any copy thereof on any other machine. The method is implemented by including a control program with the application program to be copy controlled, which control program causes an interaction and registration of the program during initialization of the program with a central computer. The method includes generating a configuration code based on the configuration of the user's computer and the communication of the configuration code to the central computer. The central computer thereafter generates a permission code based on the communicated configuration code and communicates the permission code back to the user. The permission code is then entered into the user's computer and stored as a part of the control program. Prior to each subsequent execution of the program, a recalculation of the permission code is made by the control program and a comparison of the recalculated and the stored permission codes allows further execution of the program. The configuration code may include special data unique to the user's authorized computer and the recalculation of the permission code may be enabled only by data supplied by the central computers generated permission code. Further, self destruct code may be included in the control code to avoid tampering with the copy control scheme.

12 Claims, 2 Drawing Sheets

Num 1 — Number of Disc Drives
Num 2 — 100'S Digit of Ram Size
Num 3 — 1'S Digit of Ram Size
Num 4 — Number of Hard Disk Drives
Num 5 — Logged Drive Number
Num 6 — 10'S Digit of RAM Size
Num 7 — 1'S Digit of Mode Number
Num 8 — 1'S Digit of Free Space %
Num 9 — 10'S Digit of Hard Disk Size
Num A — 1'S Digit of RAM Size
Num B — 10'S Digit of Mode Number
Num C — 10'S Digit of Free Space %

METHOD OF CONTROLLING THE COPYING OF SOFTWARE

BACKGROUND OF THE INVENTION

This invention relates to a method of controlling the copying of computer software and more particularly, to such a method which allows an unlimited number of backup copies of a program to be made for the same machine, but selectively prevents the execution of such backup copies or the original on other unauthorized machines.

In recent years, the sale and/or licensing of computer software has become an established industry of it own. In this industry, more than any other, the illegal copying of copyrighted works of authorship has robbed the copyright owner of large amounts of revenue. The illegal copying has come from many different segments of users and other sellers of computer software. On one extreme, the organized pirate copies software and then sells it at discount to potential purchasers from the true owner, in effect, putting the developer of the copyrighted version of the software out of business. On the other extreme, a rightful possessor of the software may make a limited number of additional copies for use as backup copies on the original computer, or, if authorized by the owner of the software, for use on a home computer, or for use on a replacement or additional computer used by the authorized user in the same office. Between these two extremes, many rightful possessors of software may merely give, or even lend the software to friends or others in the same office.

In the first case, the copyright owner is generally unwilling to grant his permission to the pirate. In the second case, however, the copyright owner generally should have no objection to true backup copies being used, since the user of the software has a legitimate right to make a backup copy of the software for protection against the inadvertent destruction of the original copy. On the other hand, the owner of the software copyright may or may not be willing to allow the user to copy the software for use on other computers, or the owner of the software copyright may be willing to allow the copying of the software for use on other computers in the same office for an additional fee.

Attempts to solve copying problems in the past have included various techniques of copy protection. Common for most of these techniques is the placing of code in the program which limits the number of executable copies of a particular copy of software which can be made. However, as soon as a new technique for copy protection is developed, it is quickly broken by knowledgeable computer experts. These experts then market programs which allow the so called copy-protected software to be copied at will. In some situations, such copying may be approved by the owner, such as, making backup copies, but in other situations, the copying may be without the owner's approval, and hence illegal, such as the making copies for friends. However, the copy protect schemes typically don't distinguish between the allowable copying and the illegal copying. Even to the extent that the copy protection schemes of the prior art have allowed the making of a backup copy of the software, such schemes generally don't allow a legitimate backup of the backup or multiple backups of the original for execution on the same machine. Further, the copy protect schemes of the prior art do not prevent the permitted backup copies to be given to a friend for a disallowed use on a different machine.

One drawback of many copy protection schemes of the past is that problems may occur after an authorized user copies the software into a hard disk, or other type of permanent large memory associated with the machine. These problems, as well as the protests of the user to the inconveniences and inability to make sufficient legitimate copies, have led many software vendors to discontinue the use of copy protection schemes. The result, of course, is that many unauthorized copies of software are being made, thereby causing the author of the program to lose rightful rewards for his creative endeavors.

Another problem with the marketing of software has more recently appeared as hardware technology has advanced to allow a local area networks of many computers and other sophisticated communications between computers in either the same general area or across country. One problem the software industry is facing as a result of this new technology is that large companies with many computers are demanding either site licenses or large volume discounts. In either case, the price of the software is directly tied to the number of copies and it, thus, becomes necessary for the software owner, or licensed distributor, to keep track of the number of copies of the software being made by or for the large customer. Further, many of the same problems of unauthorized copies made for friends or for machines beyond the site licensed still remain. Traditional copy protection schemes offer no solution to these problems.

It would be preferable to utilize a copy control scheme, rather than the copy protection, or prevention, schemes of the prior art in order to overcome the above noted problems. A copy control scheme is one in which the scheme does not interfere with the proper execution of the software on an authorized machine, in which the rightful possessor of the software can make as many backup copies as is desired, and in which the party charged with authorizing copies, such as a copyright owner, is able to approve, control and have knowledge of all copies made for additional machines. In addition, such a scheme should allow any of the backup copies to be executed on the authorized machine, but stop the execution of all such backup, or other unauthorized, copies on machines other than the authorized machine. Finally, such a scheme should be able to prevent override techniques, such as those programs of the prior art that override copy protection schemes, from avoiding, overriding or bypassing the copy control scheme.

Another problem of the prior art has been the ability of authorized distributors of software to assure the registration of licensed software and obtain desired feedback from users regarding computer configurations. Registration is desirable in the current environment of software marketing using unsigned license agreements, since the registration of the software with the authorized distributor may manifest the acceptance of the license terms. Further, the system configuration feedback of the software developer's customer base is valuable business information for the developer so that the developer knows what additional functions can or should be added to future enhancements of the software product, or what customer segment should be targeted in a marketing program based on hardware availability for future software products.

SUMMARY OF THE INVENTION

In accordance with one aspect of this invention, there is provided a method of controlling the use of copies of computer software, which software includes an application program for performing a desired task and an associated a first control program. The first control program allows the application program, and a copy made therefrom, to be executed on a given machine, but prevents the application program, and all copies thereof, from being executed on another machine. The method comprises the steps of generating a configuration code related to the hardware of the given machine and transmitting the configuration code to a remote machine. The remote machine is programmed with a second control program related to the first control program. Further, the method includes the steps of generating, by the second control program, a permission code at the remote machine related to the configuration code transmitted thereto, transmitting the permission code to the given machine, and storing the permission code as a part of the first control program to allow the associated application program, or copies thereof, to be executed only on the given machine.

BRIEF DESCRIPTION OF THE DRAWINGS

One preferred embodiment of the subject invention is hereafter described, with reference being made to the following Figures, in which.

DESCRIPTION OF THE EMBODIMENT

Figure 1:
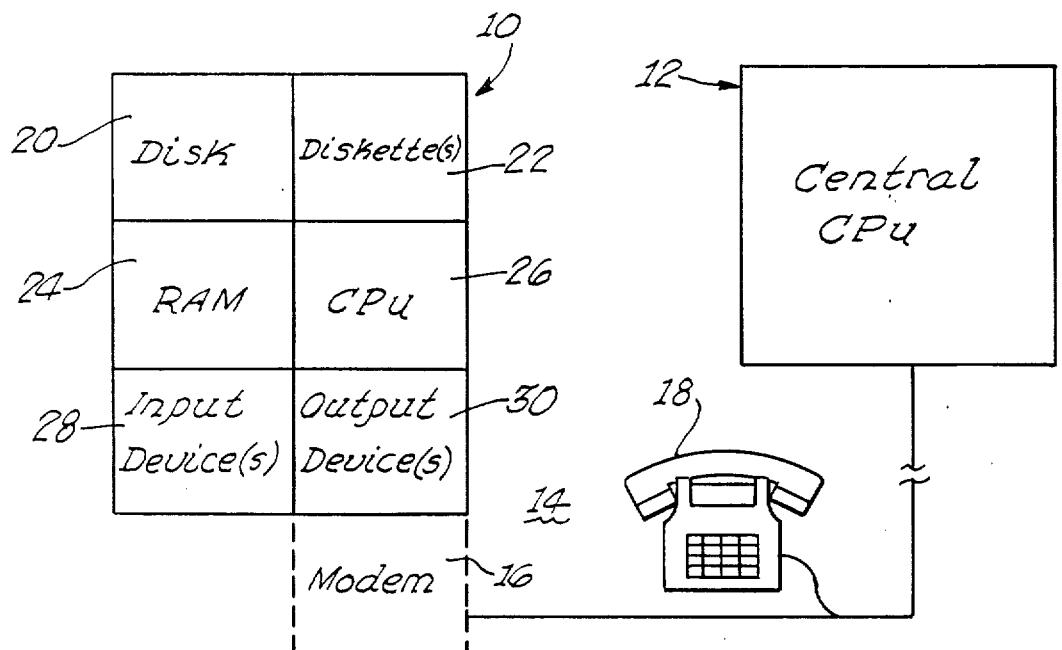
FIG. 1 shows a general system block diagram of apparatus used to perform the software copy control method of the subject invention.

Referring now to FIG. 1, a user computer system 10 and a central computer system 12, located at a location remote from the user computer system 10, are shown. A communications link 14 connects user computer system 10 with central computer system 12. Communications link 14 may take the form of either a direct processor to processor link, such as through modem 16 of user computer 10 to an associated modem (not shown) included as a part of computer 12, or an indirect link, such as through a conventional telephone 18. If an indirect link, such as telephone 18, is used, central computer 12 may communicate using a voice synthesizer prompter unit (not shown) and a signal receiver unit (not shown) included therein responsive to telephone tone signals.

User computer system 10 may be any conventional computer system, from the smallest personal computer to the largest main frame system. For example, system 10 may be a typical business personal computer system including a hard disk drive 20, one or more diskette drives 22, a defined amount of random access memory (RAM) 24, a microprocessor system (CPU) 26, one or more input devices 28, such as a keyboard, and one or more output devices 30, such as a display or a printer. In a typical operating environment, an application program is stored on either the disk associated with disk drive 20, or on a diskette inserted into on of the diskette drives 22. This program is then executed, on command of the user, that is, it is copied into the RAM 24 and controls the tasks performed by CPU 26 to cause a desired application to be performed.

One of the tasks that CPU 26 may be programmed to perform is to copy the program stored on either the disk or the diskette associated with drives 20 or 22 onto another diskette. In the past, programmers have tried to prevent this copying of the program code, as opposed to data generated by using the program, by techniques generally known as copy protection schemes. Briefly, copy protection schemes worked by preventing certain critical code from being copied, or from being copied more than a certain number of times, such as one or two. However, as soon as a programmer came up with a particularly scheme for copy protection, another programmer was able to come up with a scheme to override the protection scheme. One problem with the conventional copy protection schemes is that the code implementing the scheme is always the same for any given program. Thus, a person desiring to break the code, only has to do it once for a given program, and then all copies of the program can be copied.

The subject invention utilizes a different philosophy than has been used in the past. Rather than placing copy preventing code on the media containing the program, a footprint of the machine is taken and a control program responding to only the footprint is placed within the application program to allow that machine to make and use as many copies of the program as desired. However, the control program prevents the application program from being executed on a machine having a different footprint. Thus, a person with the right to use the program is not be prevented from enjoying the full use of his program on the approved machine, but such person is not be able to make copies of the program for use on unapproved machines. Controls are also included in the code to allow multiple machines to be approved, or to allow changes to be made to the approved machine from time to time, such as the addition of more memory to RAM 24.

In practice, the manner in which the invention is to be implemented is that the first time the application program is used, a prompt appears on the screen requiring the user to register the program for use on a defined user computer 10 with the owner or the authorizing agent of the owner. This prompt may include the serial number of the program and a configuration code generated by the application program based on the configuration of user machine 10.

The serial number of the program will have been previously assigned by the licensor or seller of the program and may include information relating to how many different machines have been authorized. For example, a serial number may allow the application program to be copied into two hard disks for execution on two different machines, or it may limit the copying to only a single machine configuration. The price the user pays for this privilege may be related to the number of machines upon which the application program is to operate. Alternatively, a purchaser or licensee of the application program may obtain a site license, allowing a certain number of copies to be made and that certain number is included as a part of the serial number. Further, in other situations, the software owner may inventory programs in a central location of a customer and only bill for the programs after distribution by the customer to its employees or other users. The billing amount could, in turn, be related to the number of programs actually in use.

The configuration code is generated after the program is loaded into the machine is based on the particular hardware parameters of the machine. For example, the configuration code may be a multi-digit number, in which each group of one or more digits includes different hardware configuration information. Further, special information, unique to a particular machine, such as information unique to a disk, disk drive or RAM based on specific tests, may also be included as a part of the configuration code.

The prompt screen informs the user starting to load the application program for the first time to call a certain telephone number to obtain a permission code to be entered into the user's computer 10. This call can be made using the modem 16 or the telephone 18 and connects the user with central computer 12. If the telephone 18 is used, computer 12 requests that the serial number of the program be first entered using the keypad of a tone generating telephone. Then, computer 12 requests that the configuration code be entered in the same way. This can all be accomplished by using a voice synthesizer as a part of computer 12, so that no human labor is involved. If modem 16 is used, information can be transmitted directly between the two computers 10 and 12 to obtain the same information.

Once computer 12 has received the correct information, it can first check to determine if another copy has been authorized for the particular serial number. If such a copy is authorized, the records are updated for that serial number. If no additional copies are permitted, a message so indicating is generated and computer 12 disconnects the link.

After computer 12 determines that a copy can be made, it generates a permission code based on the configuration code previously transmitted to it. This configuration code may be based on an algorithm defined only by the special, or configuration unique, code portion of the configuration code. Once the permission code is generated, it is transmitted to the user machine, either directly through modem 16, or to the operator of user machine 10 over the telephone 18. At that point, the user enters the permission code. The control program portion of the software then recreates the generation of the permission code based on the hardware and can compare the internally generated code to the entered permission code. If the two codes compare, execution of the program is allowed; if the two codes do not compare, then further execution of the application program is stopped and a message is displayed indicating to the user that execution on that machine has not been approved. This, of course, should only happen if the configuration of the machine upon which execution is attempted is not the same as the configuration of the machine which received the original permission code.

In order to allow the owner of user machine 10 to upgrade computer 10, such as by adding more memory to RAM 24 or adding or replacing diskette drives 22, artificial intelligence type of programming may be included as a part of the control program to accept and remember normal type upgrades and make appropriate modifications to the calculation and comparison scheme, so that the modified configuration is still able to have the application program executed thereon. Alternatively, when any change occurs, or when certain types of changes occur, the owner of the application program may desire that a new configuration code be generated and a new registration and permission code generation and entry procedure occur. Such a decision on the part of the application program owner is, in part at least, based on the value of always knowing the exact hardware configuration of its customer base.

Figure 2:
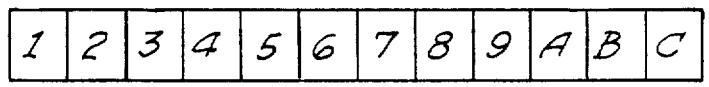
FIG. 2 shows an example of the configuration code generated at the user's machine.

Referring now to FIG. 2, an example of the configuration code is shown. In this example, the code includes twelve digits, labeled for convenience 1-9 and A-C. Each of the digits may include any number 0-9 therein, and these numbers may be encrypted, if desired. In the example chosen, the following hardware elements are measured:

1. Total Number of Hard Drive Units
2. Hard Disk Partition Size
3. Free Space Percentage on Hard Disk
4. RAM memory size
5. Total Number of Disk Drives
6. Current Logged Disk Drive
7. Mode Number The hardware data may be encoded into a twelve digit configuration code number, as follows:

| Digit Number | Meaning |
| --- | --- |
| 1 | Number of Disk Drives |
| 2 | 100's Digit of RAM size |
| 3 | 1's Digit of Hard Disk Partition Size |
| 4 | Number of Hard Drives |
| 5 | Logged Drive Number |
| 6 | 10's Digit of RAM Size |
| 7 | 1's Digit of Mode Number |
| 8 | 1's Digit of Free Space Percent |
| 9 | 10's Digit of Hard Disk Size |
| A | 1's Digit of RAM Size |
| B | 10's Digit of Mode Number |
| C | 10's Digit of Free Space Percent |

The two digit Mode Number used in the configuration code may be a special number calculated for a particular machine based on a unique configuration footprint of the user's computer 10. For example, the Mode Number may be determined by utilizing the fact that the oxide coating on all hard disks is not perfectly uniform and further that the nonuniformity is different from one computer to another computer. A special formatting utility program, such as those used by the disk manufacturers for quality control, can then be used to allow unstable bytes of information, as defined by the special formatting program but not by normal commercial standards, found in one or more sectors of the disk to be determined. Since the nonuniformities on the disk or diskette remain constant with time, the test is repeatable, since the special format program will arrive at the same number each time it measures the same disk or diskette. Once the number of unstable bytes is determined, that number can be reduced to the two digit Mode Number by, for example, only using the two least significant digits, or by summing the digits until a one or two digit number is found. The Mode Number can further be modified so that it can differentiate between soft disks, that is floppy disks or diskettes as such are commonly called, or hard disks, by for instance reserving certain numbers for each type or using even numbers for soft disks and odd numbers for hard disks. The copy control scheme can then differentiate and use different copy control procedures for software designed to be stored on different types of media.

The remaining information relating to the hardware defined portions of the configuration code are easily obtained by conventional techniques and can be inserted into the configuration code in the proper position by the control program portion of the software. It should be understood that the configuration code may, if desired, be encrypted or compressed in any conventional or proprietary manner. It is only necessary that a corresponding second control program in central computer 12 is correspondingly programmed to understand the configuration code. For example, the Mode Number, as previously mentioned, may be any number between 00 and 99 and this number is based on a physical measured criteria, such as the number of unstable bytes found on a hard disk by using a special formatting program. However, the Mode Number included in the configuration code may be different than the number measured, due to an encryption technique. For example, the Mode Number in the configuration code may be determined by first adding a number found by multiplying the sum of the first and last digits of the configuration code by three and then adding that number to the measured value. Such addition could occur either before or after the measured physical criteria number is reduced to two digits. Further, the Mode Number may be forced to an even or odd number if it is desirable to control the copying of soft and hard disks in different manners.

Once the serial number and configuration code is communicated to central computer 12 by either modem 16 or telephone 18, central computer 12 performs the necessary checks against the serial number and stores the hardware configuration data in an appropriate data base. Then, central computer 12 calculates the permission code based on the hardware configuration information provided thereto. Central computer 12 has many different algorithms it can use to calculate the permission code and the particular one selected relates to the unique Mode Number portion of the configuration code. For example, if the Mode Number is 75, then the algorithm to calculate the permission code may be the sum of the RAM size plus the hard disk size, times the percent of free space. For a different Mode Number, a different algorithm using different portions of the configuration code information is used to calculate the permission code.

After the permission code generated by computer 12 is returned to and entered in user computer 10, user computer 10 is able to duplicate, with the appropriate additional information that may be contained in the permission code (or previously included in the control program) the recalculation of a permission code based on retesting the hardware configuration. As long as the recalculated permission code and the originally entered permission code are the same, execution of the application program on the user computer 10 is allowed to continue. This is also be true for any backup copies of the application program which the user desires to create, since the regeneration of the permission code results in the same permission code as was originally entered.

However, if a person attempted to execute a copy of the software on another machine, the attempt to recalculate the permission code would result in a different permission code being recalculated. In this instance, the control program associated with the application program would see non-matching permission codes and would then prevent execution. However, if the proprietor of the software had granted rights to run the software on a second machine, a message could be placed on the screen advising the user that the use on second machine must be registered. In such an instance, the second machine user would communicate with central computer 12, as previously explained, and would receive a new, and different, permission code based on the hardware configuration of the second machine. However, where all of the allowed machines had previously been registered, central computer 12 would immediately know this fact from checking its data base information. In such an event, central computer 12 would communicate back the message indicating that no additional machines had been authorized. The customer could then obtain the additional authorization by paying the required fee or use the software only on an authorized machine, such as user computer 10.

Figure 3:
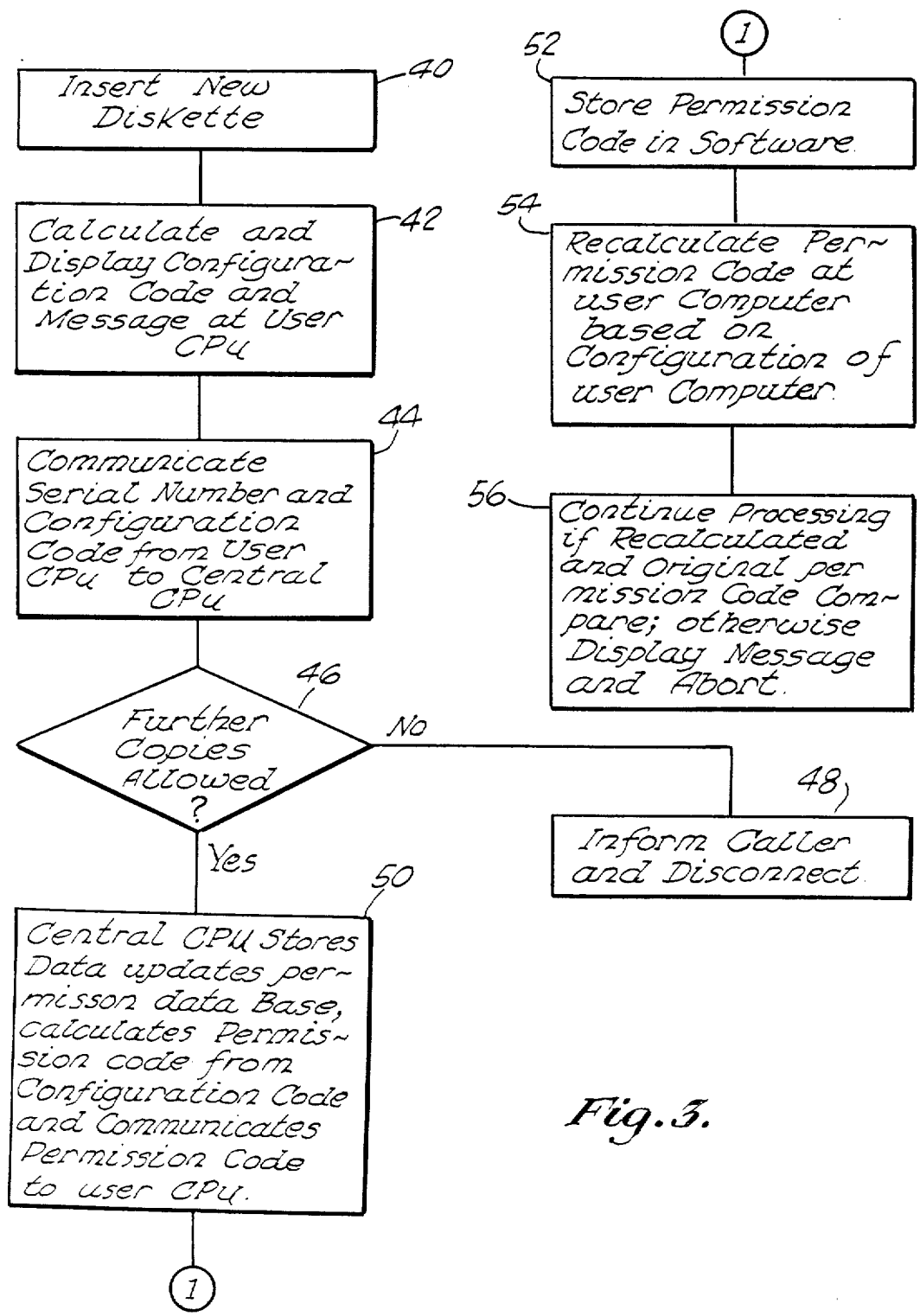
FIG. 3 shows a flow diagram of the procedures in obtaining authorization to use software subject to copy control on a given computer.

Referring now to FIG. 3, a flow diagram of the procedure for initializing the copy control scheme on a given item of software is shown. FIG. 3 includes blocks 40 through 56 (even numbers only). Beginning at block 40, the diskette containing the application program and the control program is inserted into the user's computer 10 and according to block 42, the configuration code is calculated and displayed by the user's computer 10 along with the serial number of the program and a message instructing the user to communicate with central computer 12. Other information regarding the copy control scheme may also be conveyed, such as the general manner in which the scheme operates to allow an unlimited number of backup copies to be made for execution on the user's computer 10, but not for execution on any other computer.

Next, according to block 44, the user communicates the serial number and configuration code to central computer 12 using either modem 16 or telephone 18, as previously explained. Additional information may also be communicated at this point, such as the telephone number of the user or a security code. Thereafter, according to block 46, central computer 12 checks its data base to be sure that a copy of the software is permitted. If not, then according to block 48, central computer 12 informs the user that no additional copies have been authorized and terminates the communication link. If central computer concludes that another machine is authorized to copy and execute the software, then, as indicated at block 50, central computer 12 stores the configuration data and updates its data base for the transmitted serial number. Next, central computer 12 calculates the permission code from the information contained in the transmitted configuration code and communicates the calculated permission code back to the user over the communication link.

Thereafter, as indicated at block 52, the user enters the communicated permission code for storage with and subsequent use by the software. The subsequent use, as indicated at block 54, is the recalculation of a permission code by user's computer 10 under the control of the software and, as indicated at block 56, a comparison between the originally entered permission code and the recalculated permission code occurs. The recalculation may, in part, either include or be controlled by a unique response to information communicated from central computer 12 as a part of the original permission code. If the comparison is made, execution is allowed to continue; however, if no comparison is found, execution is stopped and an appropriate message is displayed informing the user that authorization for that computer has not been granted. A reauthorization procedure, beginning at block 40, may then be attempted and if use of the software on additional machines is authorized, a new permission code for the new machine will be given.

It should be noted that when the user computer 10 recalculates the permission code at block 56, the recalculation is based on both the hardware configuration and the original permission code. In order to allow the user to upgrade computer 10, artificial intelligence may be included in the software to note and remember certain types of upgrades which occur and to modify the original permission code based on such modifications. However, certain modifications, such as those which affect the hardware from which the Mode Number was derived, may result in a new registration procedure being required.

Many additional safeguards can be placed in the system to prevent attempts to override the copy control system. For example, the communication between the user and central computer could include the user's telephone number, which number could be checked by computer 12 redialing that number to again contact the user, or to see if a busy signal were received or to make the user give a security code after the redial. If it turned out that an unauthorized copy of the software were at that telephone number, then the location of unauthorized software could be determined. Other safeguards can include dispersing the control program throughout the application program and using techniques which would cause the control program to self destruct itself or the application program if attempts to modify, or even print, the control program were made. This would prevent, or greatly inhibit any attempts to override the copy control scheme of the subject invention in the manner that the copy protect schemes of the prior art have been overridden.

What is claimed is:

1. A method of controlling the use of copies of computer software, said software including an application program for performing a desired task and a first control program, said first control program allowing said application program, or a copy thereof, to be executed on an authorized given machine, but preventing said application program, or a copy thereof, from being executed on another unauthorized machine, said method comprising the steps of:

generating a configuration code in response to the hardware of said given machine;

transmitting said configuration code to a remote machine, said remote machine being programmed with a second control program, one of said first or second control programs including information defining a number of authorized copies which can be and have been made for use on machines in addition to said given machine;

generating, by said second control program, a permission code at said remote machine in response to said configuration code;

transmitting said permission code to said given machine;

entering said permission code as a part of said first control program to allow said associated application program, or copies thereof, to be executed only on said given machine; and determining whether the number of authorized copies has been reached and, if said number of authorized copies has not been reached, repeating said steps of generating a configuration code, transmitting said configuration code, generating a permission code, transmitting said permission code and entering said permission code for each additional machine on which said application program is to be executed.

2. The method according to claim 1 wherein said step of generating said configuration code includes manifesting selective hardware configuration parameters of said given machine in said configuration code and further manifesting a generated parameter based on the particular hardware of said given machine, said generated parameter being generated by said first control program.

3. The method according to claim 2 wherein said step of manifesting a generated parameter includes generating a number in response to said parameter.

4. The method according to claim 3 wherein said step of generating a number in response to said parameter includes performing a repeatable test on one item of hardware of said given machine.

5. The method according to claim 4 wherein said step of performing a repeatable test includes the step of determining the nonuniformities on said item of hardware.

6. The method according to claim 2 wherein said step of generating said permission code includes utilizing an algorithm unique to said generated parameter manifested by said transmitted configuration code.

7. The method according to claim 6 wherein said step of manifesting a generated parameter includes generating a number in response to said parameter.

8. The method according to claim 7 wherein said step of generating a number in response to said parameter includes performing a repeatable test on one item of hardware of said given machine.

9. The method according to claim 8 wherein said step of performing a repeatable test includes the step of determining the nonuniformities on said item of hardware.

10. The method according to claim 9 wherein said step of determining the nonuniformities includes determining a number of unstable storage units on a magnetic storage means.

11. The method according to claim 1 wherein said step of generating a configuration code includes the step of encrypting said configuration code.

12. The method according to claim 11 wherein said step of encrypting includes utilizing data obtained from said hardware of said given machine for determining the encryption of said configuration code.

* * * * *